(12) United States Patent
Cabrera et al.

(10) Patent No.: US 7,248,852 B2
(45) Date of Patent: Jul. 24, 2007

(54) METHOD AND SYSTEM FOR WIRELESS DISTRIBUTION OF LOCAL INFORMATION

(75) Inventors: Alex Cabrera, Stockholm (SE); Xavier Aubry, Stockholm (SE); Martin Dahlstrand, Danderyd (SE); Fredrik Andersson, Stockholm (SE); Kimberly Lei, Cambridge, MA (US)

(73) Assignee: Appear Networks Systems AB, Stockholm (SE)

( * ) Notice: Subject to any disclaimer, the term of this patent is extended or adjusted under 35 U.S.C. 154(b) by 0 days.

(21) Appl. No.: 10/475,341
(22) PCT Filed: Apr. 29, 2002
(86) PCT No.: PCT/SE02/00841

§ 371 (c)(1),
(2), (4) Date: Apr. 8, 2004

(87) PCT Pub. No.: WO03/007553

PCT Pub. Date: Jan. 23, 2003

(65) Prior Publication Data
US 2004/0171379 A1    Sep. 2, 2004

Related U.S. Application Data

(60) Provisional application No. 60/286,992, filed on Apr. 30, 2001.

(30) Foreign Application Priority Data
Apr. 27, 2001   (SE)   .................... 0101524

(51) Int. Cl.
H04Q 7/20   (2006.01)
(52) U.S. Cl. ................ 455/403; 455/414.1; 455/550.1; 455/566
(58) Field of Classification Search ........... 455/403, 455/566, 412.3, 414.1, 414.2, 550.1, 414.3, 455/425
See application file for complete search history.

(56) References Cited

U.S. PATENT DOCUMENTS 5,848,356 A * 12/1998 Jambhekar et al. .......... 455/403

(Continued)

FOREIGN PATENT DOCUMENTS

GB        237564        1/1999

(Continued)

OTHER PUBLICATIONS

1999 IEEE Proceedings of the 24th Annual Conference on Local Computer Networks.

(Continued)

*Primary Examiner*—Charles N. Appiah
*Assistant Examiner*—Nghi H. Ly
(74) *Attorney, Agent, or Firm*—Harness, Dickey & Pierce, P.L.C.

(57) ABSTRACT

In a system, called an application manager, portable devices can be connected in various kinds of local area networks (LANs). In the portable devices, local browsers are run to find services by listening in the local area network to messages broadcast from a local information server through some base unit. The local information server registers local services and provides, on automatic requests from the local browsers, address information of the local services. The address information is used by a local browser to obtain, through the Internet, general information of the services from an HTTP server, that contains information of applications, such as graphical information including icon files and short descriptions of the applications. After receiving the general information symbols of available services, it is then shown on the display of the portable device. The user can then by a single click access a service and then the local browser automatically downloads the user part of the application the symbol of which has been clicked and starts to execute the program of the application. The executing generally does not require communication or information relevant to the current location of the user, such as timetable information for trains and air flights.

25 Claims, 11 Drawing Sheets

U.S. PATENT DOCUMENTS 6,091,956 A * 7/2000 Hollenberg ............... 455/456.5
6,597,917 B1 * 7/2003 Meuronen ................... 455/466
6,631,278 B2 * 10/2003 Abrol et al. ................ 455/564
6,668,177 B2 * 12/2003 Salmimaa et al. .......... 455/566

FOREIGN PATENT DOCUMENTS

GB 2352588 1/2001
WO WO00/59239 10/2000

OTHER PUBLICATIONS

'Axis Mobile Access Server'. Axis Communications.(c) 2000. Retrieved on May 27, 2000 from the Internet: http://www.axis:com/documentation/datasheet/mas/mas_description.pdf.

* cited by examiner

METHOD AND SYSTEM FOR WIRELESS DISTRIBUTION OF LOCAL INFORMATION

RELATED APPLICATIONS

This application claims priority and benefit from Swedish patent application No. 01015247, filed Apr. 27, 2001 and U.S. provisional patent application No. 60/286,992, filed Apr. 30, 2001, the entire teachings of which are incorporated herein by reference.

TECHNICAL FIELD

The present invention relates to a method of locally distributing information to a user device, preferably a portable user device that can geographically move, and to a system or network in which information is locally distributed to user devices.

BACKGROUND

Hardware providers such as Red-M, Axis, A Brand New World are developing platform software and applications. However, their solutions are admittedly designed to showcase the deployment of their hardware solution in public venues and not to be launched on the market The way in which the solutions of most of the hardware providers today work in distributing content is through an ordinary WEB-browser. Most commonly, when entering an area with a public WLAN the operator pushes, through the browser of the user's device, a homepage shown on the monitor of said device. Then the network of the respective operator or provider is accessed by logging in thereto by entering a user name and a password. Then, the user can, using his device, browse among the services that are available at the site. This allows the user to view different homepages and to use simple interactive services, having user parts in the shape of applets written in the programming language JAVA. There are many problems associated with this method The services offered are limited to applets that are very simple programs run through the JAVA interpreting program of the WEB-browser. Today, it is not even possible to run JAVA-applets on WEB-browsers designed for used with PDAs (Personal Digital Assistants) though this may be possible in the future.

In the published British patent application No. 2 327 564 a system for wirelessly distributing locally adapted information to mobile units is disclosed. The system comprises a wireless network, a plurality of base stations connected to the network and to the Internet, a plurality of server computer systems also connected to the Internet and geographically distributed totters. Each transmitter continuously issues signals containing the Internet address of a server system that contains the information associated with the area in which where the transmitter is located, each transmitter issuing a different Internet address. These signals can be received only by mobile units staying in the neighborhood of the respective transmitter. The units then automatically receive the home page indicated by the Internet address and thereby obtain information that is associated with the geographical area where the transmitter is located.

In the published British patent application No. 2 352 588 distribution of information is disclosed, the information associated with special items of interest. Beacons issue wirelessly code signals that can comprise Internet addresses, the issued signals having a limited coverage. A mobile unit in the vicinity of a beacon receives such a code signal and transmits it wirelessly, in a network such as Bluetooth, UMMS or a LAN, to a base station that through a server is connected to e.g. the Internet The base station then gets the home page associated with the address and sends it to the mobile unit in which the home page is shown on the display.

SUMMARY

It is an object of the invention to provide a method providing information locally in a simple way to a user who must only perform a minimum of manual input operations to receive the information.

It is another object of the invention to provide a system or distribution network for easily providing information locally to a user, such as local information relevant to or associated with the current geographical location of the user.

Thus generally, for achieving local distribution of information in a simple way a system or distribution network, herein called an application manager, is provided for use in various kinds of local area networks (LANs), such as in Bluetooth networks and WLAN networks, the networks preferably being IP based networks. The application manager system comprises browsers used to find services, a local information server registering local services and at least one service information server, herein also called a H7TP server, that hosts general information of applications, such as graphical information including icon files and short descriptions of the applications, and user parts of applications which are downloadable to the browsers.

Thus, the system distributes applications in preferably wireless networks. When a user having a suitable electronic, preferably portable, device enters a geographically restricted area in which local applications are available, icons representing the services are automatically shown on the display of the user device. The user device can be any suitable device such as a PDA or a mobile telephone but it can also be a laptop or desktop computer. An application is then easily downloaded by a click of the user on the respective icon.

When the user leaves the area the icons disappear from the display and the user parts of possible downloaded services can be removed from the memory of the user device. In particular, the user parts of such applications that bring value to users and that e.g. are not location dependent can be permanently kept in the user device for on- and/or offline usage, online meaning that the user device must be in communication with a server in the Internet and offline meaning that no such communication is required for the application to be executed Also, the user parts of other applications can be permanently kept in the user device to allow a rapid access when again entering the same area and any other area in which the same application is available.

The system comprises six different parts or functions which can all be physically distinct. However, some of them can be run on the same server or servers and some can even be incorporated in another one of the parts. The system provides the user with a true "click and run" functionality. Using a single click on an icon the user part of an application is downloaded and executed. No long and cumbersome synchronization is required.

A local browser generates the user's interface to the system. It has functions for showing icons, downloading, installing and managing the user parts of applications. It is run at any suitable device, typically at wirelessly enabled devices such as PDAs, PocketPCs, Palm computers, and mobile telephones that should be enabled for executing program code written in JAVA. The local browser can then remove unwanted applications when the user leaves a geographically area in order to save the scarce memory space of the device.

A local information server (LIS), also called a service information server, comprises software that holds and sends information about locally available services. The information is sent to users typically using the protocol Bluetooth or through WLAN access points.

A local information server manager (LISM) comprises software that holds all local information servers updated and manages the services available at the LISs.

A graphical user interface of the local information server manager (LISM GUI) shows available local information servers and the services available through them. The user interface enables an administrator to add and remove services from local information servers. The LISM GUI can be run anywhere in any WEB-browser.

An HTTP server, also called a storage information server or service application server, is a WEB-server that hosts icon files and information files of the available services and the user parts of the applications or services. The HTTP server can be e.g. located anywhere on the Internet.

A global information server (GIS), also called a service server, is a server that holds information about services those are supposed to be available in larger geographical areas and/or everywhere around the world.

Typical institutions or companies in which the system can be used and the services offered can include the following. In hotels most of the check-in procedure can be executed using the system, menus can be shown and items ordered therefrom and a map of the hotel can be shown. In restaurants and cafes menus can be shown and items ordered therefrom and even secure payment can be arranged. In public transportation facilities like waiting halls for trains, subways and air flights timetable information and current traffic information can be shown. A company can offer some free services within its area or premises, such as games to played on the user device, e.g. when waiting for some personal service in the company, or for example free telephone calls.

The advantages of the system include that a service can be accessed by making a single click on an icon shown. There is thus no need to search for the service, no need to click several times and there is no need to write any URL to get local information. A personalization can be made, i.e. the local browser can be customized for the user to only show services of some selected kinds. There is no need to install the user part of applications. The system is device independent due to the preferred use of the JAVA language. The system works in the preferred embodiment in a wide range of IP based networks, e.g. Bluetooth, WLAN, HiperLAN, GPRS and UMTS. It provides the user with interactive services, not only pages with static information. The system allows both on- and offline services.

The British patent applications cited above, which are incorporated by reference herein, specify that the information made available to wireless devices consists of web pages pointed to by a URL. However, the system described herein is used to distribute not only web pages, but rather full applications. Applications are described as a symbol part and a user part, where the symbol is an image and meta data about the application that is used to present it to end-users before the downloading to the user device, and where the user part is the complete stand-alone application executable itself. The applications can be both JAVA applications and native applications for any operating system and hardware platform.

Stand-alone applications, i.e. applications that are executed locally on the wireless user device and that do not require a browser or other client software to be run, can be both online and offline and utilize the onboard processing capacity of the wireless device. Whilst web pages can only be used online, i.e. when the user device is connected to a server connected to the Internet, stand-alone applications can be used offline, without communication with the Internet, e.g. even outside coverage of the Internet Stand-alone applications can be much more interactive than web pages, including arcade style action games and word processors. Normally services that do not require an online connection or would suffer from the demand to be online are implemented as stand-alone applications. Examples of stand-alone applications are productivity applications for mobile workforce and games.

A great advantage associated with stand-alone applications for wireless devices is that using stand-alone applications consumes much less power compared to browsing web pages. It is very power intensive to use wireless communication such as WLAN from a handheld computer and when using web pages a continuous connection during the entire browsing section is required. For stand-alone applications the connection is only required when the application itself is downloaded. The communication link can then be put on hold and the application used offline.

In the cited patent applications the descriptions are made in terms of radio communication over a wireless network, not IP traffics over a local area network, which is the case with the communication in the system described herein. By using IP multicast the communication can be run on top of any IP local area network, as opposed to directly over the radio interface of a particular wireless network standard This allows the solution to be network agnostic—it will hence work on any IP-based data communications network, not only Bluetooth or IR networks. It is also important to realize that this means that the solution can be run on any wireless device, not only in devices having custom build hardware as in the cited patent applications.

Another difference is the granularity with which information is downloaded over the network The cited patent applications disclose that the wireless device upon receiving signals from a local transmitter get an address to information that is instantly and automatically downloaded. In the system described herein instead the wireless device downloads meta-information about the applications that are available in the current network zone. This means that everything has not to be downloaded at once, but can be selectively requested by the user as he wishes.

In the system described herein applications can be automatically flushed from the wireless device in order to save valuable memory space. However, this is not the same as closing a network connection when loosing network coverage. This function is optional and applications can be allowed to be saved for offline usage outside Internet coverage as well that is not possible for web pages.

Second, this feature does not only make the most of the scarce memory resources, but it also allows operators of the system to require that end-users must be in a specific network zone to use the applications. If applications are automatically removed when a user leaves a network this means that a coffee shop, airport lounge or similar, can deploy applications that users must be present to use. This is a powerful tool for providing loyalty applications that can only be used on-site.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 1:
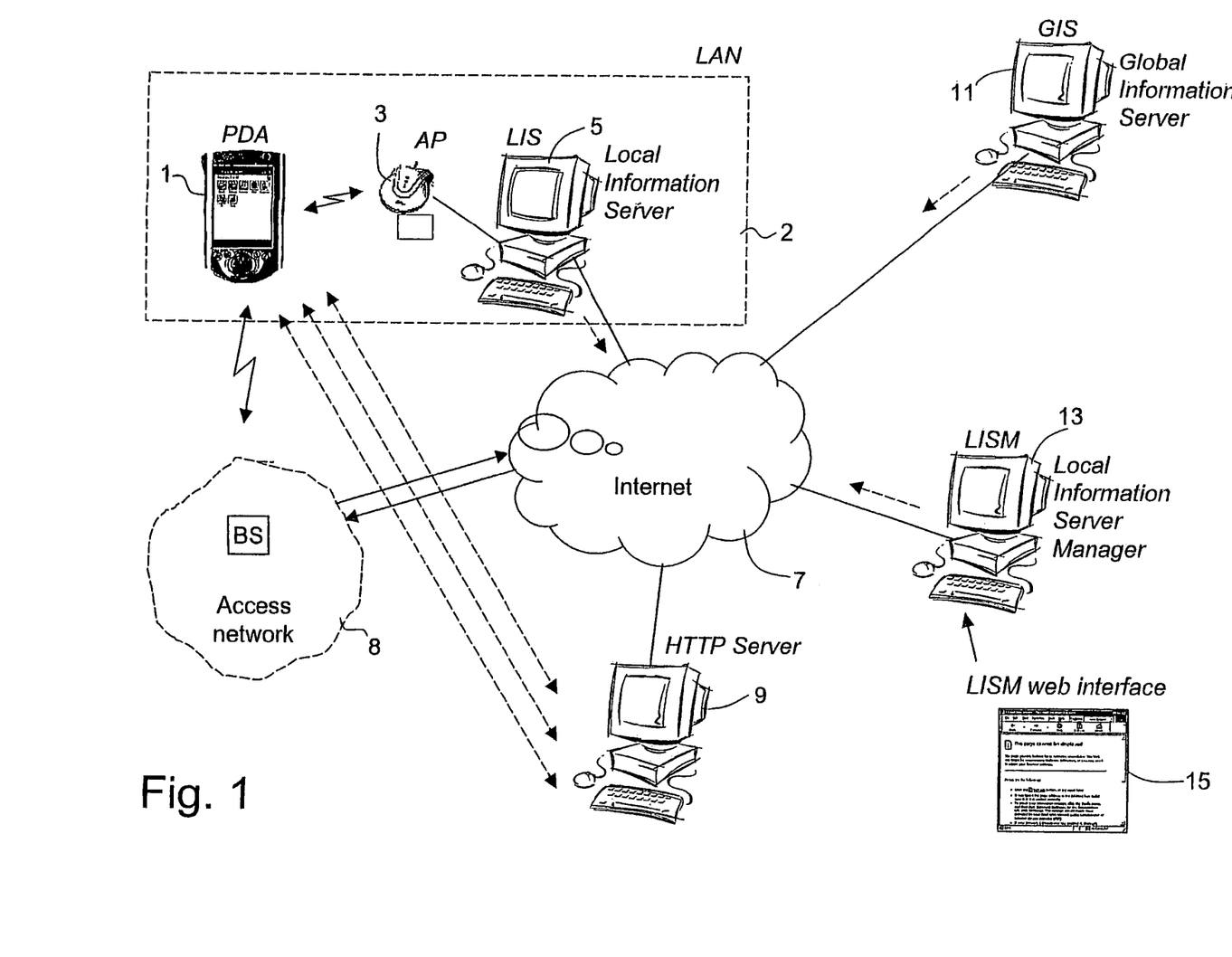
FIG. 1 is a general block diagram of a system for locally providing information.

In the system illustrated in FIG. 1 a user has some e.g. portable device such as a PDA 1 equipped with circuits for connecting to and communicating in a local area network 2, in particular a wireless local area network. It receives broadcast or multicast messages from a base unit or access point AP 3 also connected in the same local area network. The base unit is in communication with a local information server LIS 5 that is typically a computer or logically an application run in a computer. Both the portable device 1 and the base unit 3 have facilities for connecting to and communication with the Internet 7, the portable device preferably making this communication wirelessly, such as through an access network 8 comprising at least one base station for telephone communication.

To the Internet 7 also at least one HTTP server 9, a global information server GIS 11 and at least one local information server manager LISM 13 are connected these servers physically being one or more computers or logical applications run on one or more computers.

Typically, the system includes a plurality of LISs 5, each having at least one own AP 3. The HTTP server 9 can contain the services associated with a particular LIS or with several LISs. Thus, also several HTTP servers can be provided if suitable.

Figure 2:
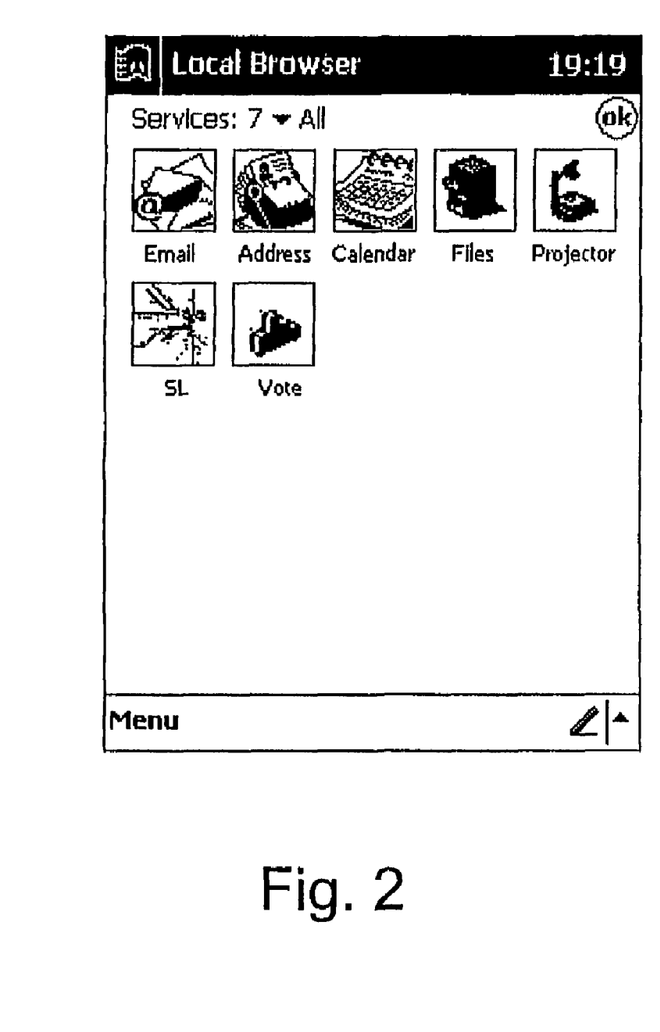
FIG. 2 is an image shown at the display of a user device, the image having icons for available services.

A special program, a local application browser, is assumed to be activated and running on the portable device 1. It listens to possible broadcast or multicast messages sent from base unit 3. After it has received a broadcast message it establishes contact with the LIS 5, obtains address information therefrom and then downloads associated service information and icons or correctly icon files from the HTTP server 9 through the Internet 7, the information of the icon files being shown as icons on the display of the user device, see FIG. 2. FIG. 2 is a picture of a display on which seven icons having the titles "SL", "Vote", etc. are shown. The user can then click on an icon shown on the display of the portable device and then the user part of the application associated with the icon shown and clicked on is downloaded, also through the Internet 7 from the HTTP server 9, the user part e.g. comprising a program written in JAVA. The application can then started to run or is preferably automatically started to run on the portable device 1. The local application browser of the user device periodically checks its connection with the LAN 2 in which the base unit 3 is connected. When the connection with the LAN disappears, such as in the case where the user device has moved to place distant from the AP in which no wireless communication is possible, the icons associated with icon files downloaded in response to the previously received broadcast or multicast message from the AP 3 also disappear from the display of the portable device 1 and the corresponding application files, the user part of the applications, if any, can be removed from the memory of the portable user device. However, the device 1 may be allowed to save the icons and files of some applications in its memory so that they can be used outside the local area network 2.

Figure 3:
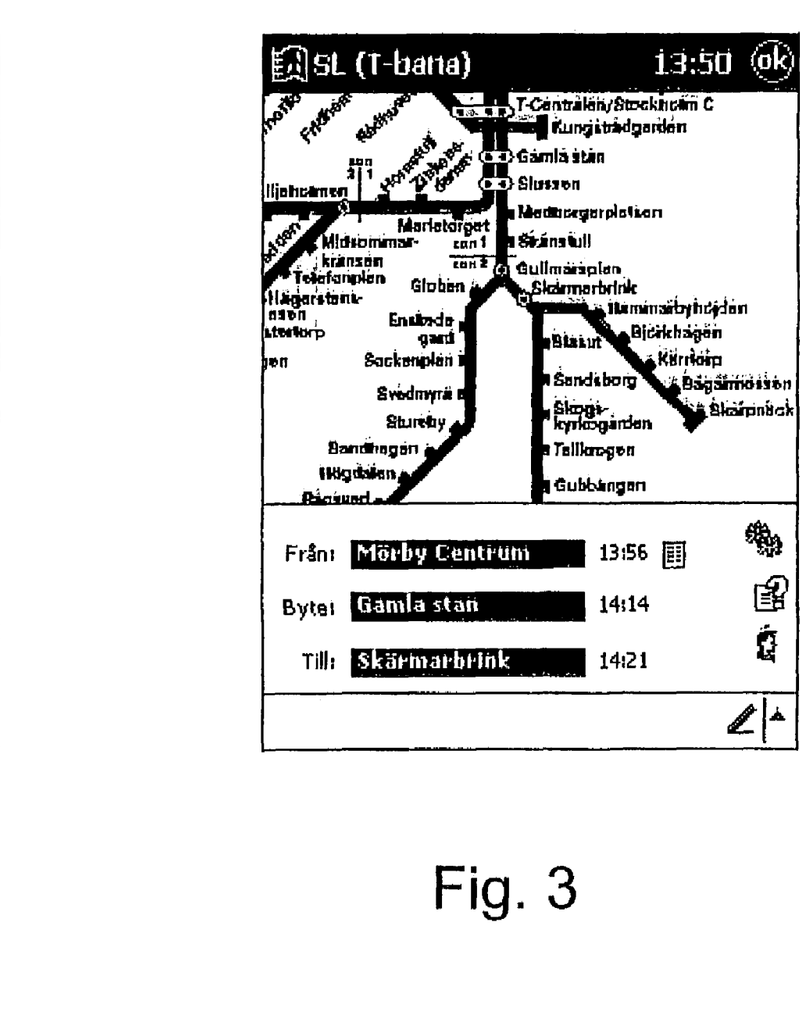
FIG. 3 is an image similar to that of FIG. 2 showing a diagram of a subway system in which a user can obtain traffic information.

If the user for instance clicks on the icon "SL" in FIG. 2 an application can be downloaded producing a picture as shown in FIG. 3. Here a map of the underground or subway system of Stockholm is shown and by clicking on the map or writing in fields at the bottom of the picture the user can get valuable time-table information such as the times when a train is scheduled to leave a station and reach another station and possible stations where changes of train are required. In the fling application the program in the portable device will possibly ask for and receive information from a server—a GIS 11, associated with the application and connected to the Internet 7.

The LIS 5 holds information on available services in the local network. The LIS 5 announces its existence by sending multicast messages through the APs 3. These messages comprise the location of the LIS as given by some address. The LIS 5 receives information on new services from the LISM 13. When a device 1 has discovered a LIS 5 by receiving a broadcast or multicast message, it connects to the LIS in the LAN 2 and sends a request to the LIS for available services. This information is sent to the portable device in response to the request The functions of the units used in the system or generally the functions used in the system will now be summarized The portable device 1, such as a PDA or a JAVA enabled telephone, has a local application browser running therein which is a small program. The local browser performs the following tasks:

1. Through a wireless interface to some general kind of LAN 2 the local browser listens to and receives multicast messages from LISs 5. When receiving such a message it connects to the LIS to which the message belongs and obtains information, e.g. suitable addresses, of applications available at the LIS. Specifically, the local browser receives a service list containing information on where the services can be found on the Internet. Each list object contains the IP address of the HTTP server 9 that hosts the service and the name of the service.

2. For each application it connects to the respective HTTP server 9 and obtains descriptive information on the application, such as a file of type .xml therefrom and information on the icon of the application, typically a small bit-mapped file. It shows the icon on the display of the device 1 and when requested information on the application. Specifically, the descriptive information file of a service can contain the full name of the service, a description of the service, etc. The icon file can be a graphical information file of type .jpg or .gif.

3. For a click on a displayed icon it checks whether it has already obtained the corresponding application executable file or files of preferably type jar. If it has not or in the case where the stored program is older than that now available, it connects to the respective HTTP server again and downloads the application therefrom. Then it starts the execution of the program file.

4. After having connected to the LIS it periodically checks that it can still hear the multicast messages issued from an AP 5 connected to the LIS. If it cannot, it removes after some predetermined time period, e.g. 2.5 s, the icons, information and applications that are possibly running associated with applications to which it has received originally address information from the LIS 5. It also checks the session number in the received multicast packages to determine whether it has been changed, i.e. differs from the session number stored in the user device. If it determined that the session number has been changed, the local browser sends a request to the LIS to send the new service list Thereafter, it communicates, in the same way as after connecting to the LIS 5, with the respective HTTP servers 9 to get the icons and information files of all the new services in the new list.

The LIS 5 is connected to a LAN or is capable of forming some kind of a LAN, e.g. a Bluetooth piconet.

Thus, the tasks of a LIS 5 include:

1. It continuously or periodically multicasts or broadcasts, through an AP 3 connected thereto, messages containing its address, its port and its session number, typically the sequence [193.10.39:1:0], e.g. once every second. Thus, specifically it can periodically send IP-multicast packets containing its IP-address, its port number, and a session number to listening devices having the local browser installed and running. The multicast packets are preferably sent through Bluetooth access points and/or WLAN access points. It can also be sent over other wireless and wired IP networks. The session number in the multicast packet tells a listeing device whether available services have been changed 2. It connects to a portable device 1 when obtaining a connection request from the device and then sends information on the services currently registered in the LIS, i.e. the list of locally available services. The list is tailor-made considering the area which is covered by the AP 3 and in which the user device is currently located.

3. It receives updates of available applications from the LISM 13.

4. It periodically checks the available applications by sending control commands through the Internet 7 to the HTTP server 9 and indicates in the corresponding registered service information object whether it is currently available.

5. It notifies, when starting to be executed, the LISM 13 of its IP-address.

The LISM 13 is an application run on a server connected to the Internet 7, i.e. a program executed therein, and it has a graphical user interface GUI 15 that can be run in a WEB-browser that has a connection to the LISM. On the GUI a service operator can see a list of all connected LISs 5 and also see some status information thereof. For each row in the list a sublist of all APs connected to the LIS given in the row can be shown. For each AP 3 the applications available at that AP can be seen in a further sublist. In the GUI the applications run on each AP can be added or deleted.

The tasks of the LISM 13 include:

1. It receives application vectors from LISs 5 when requested.

2. It sends update application vectors to LISs when needed, i.e. when updated in the GUI.

3. It receives from the service operator through input devices on the LISM GUI connected to the LISM server information on the applications to be available at the LISs and sends information thereof to the LISs.

The HTTP server 9, also called a storage information server, is connected to the Internet 7 and has the following tasks:

1. It stores some basic information of the applications available in the system as administered by the service providers.

2. When requested by a user portable device 1 it transmits a file comprising short or basic information on an application and an icon-file, of type e.g. .gif/.jpg/.png.

3. When requested by a user portable device 1 it transmits an executable or program file(s) comprising the user end program of an application, the file being suitably of type .jar (compressed JAVA program code).

Figure 4:
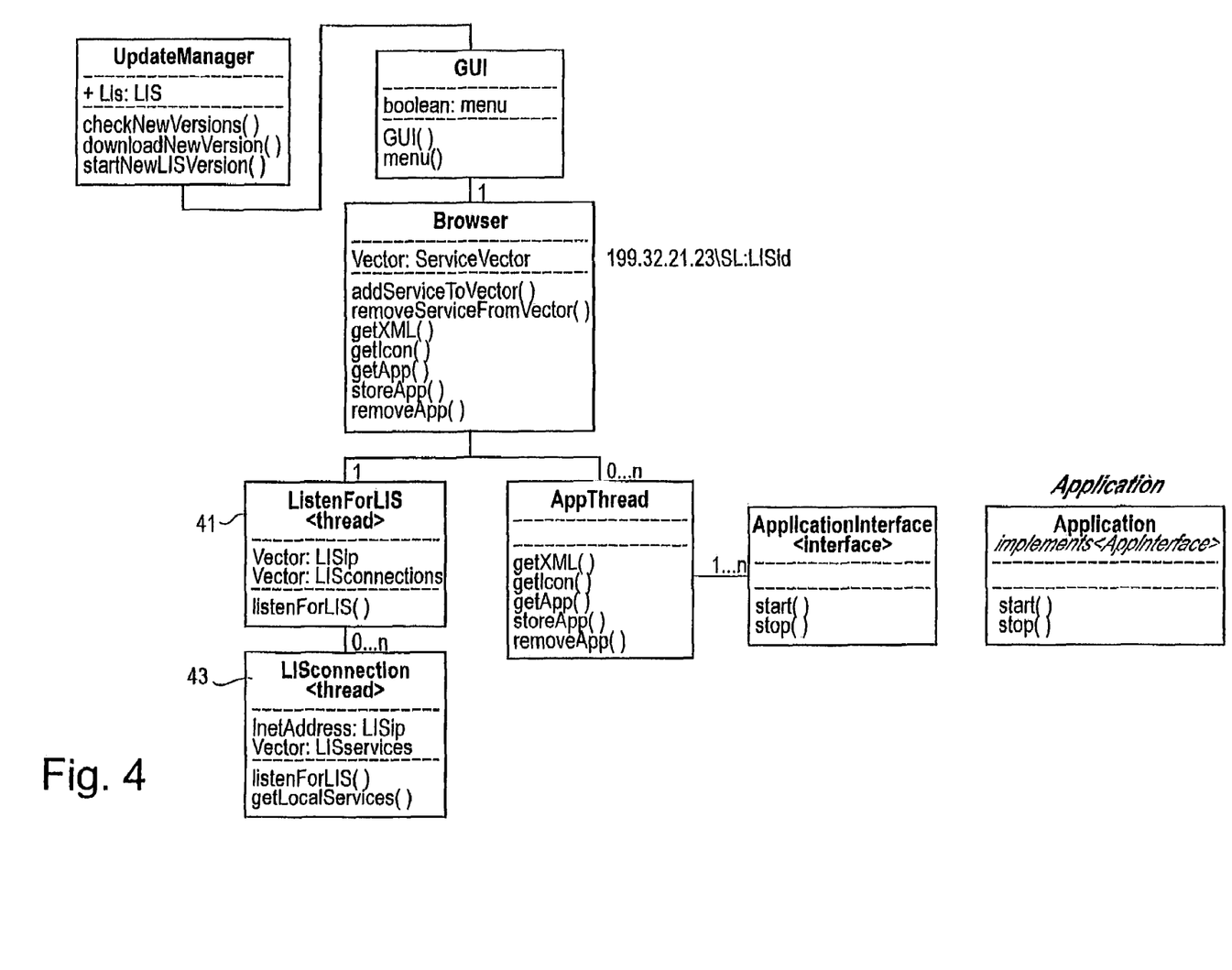
FIG. 4 is a class diagram of a local browser run in a user device.
Figure 5:
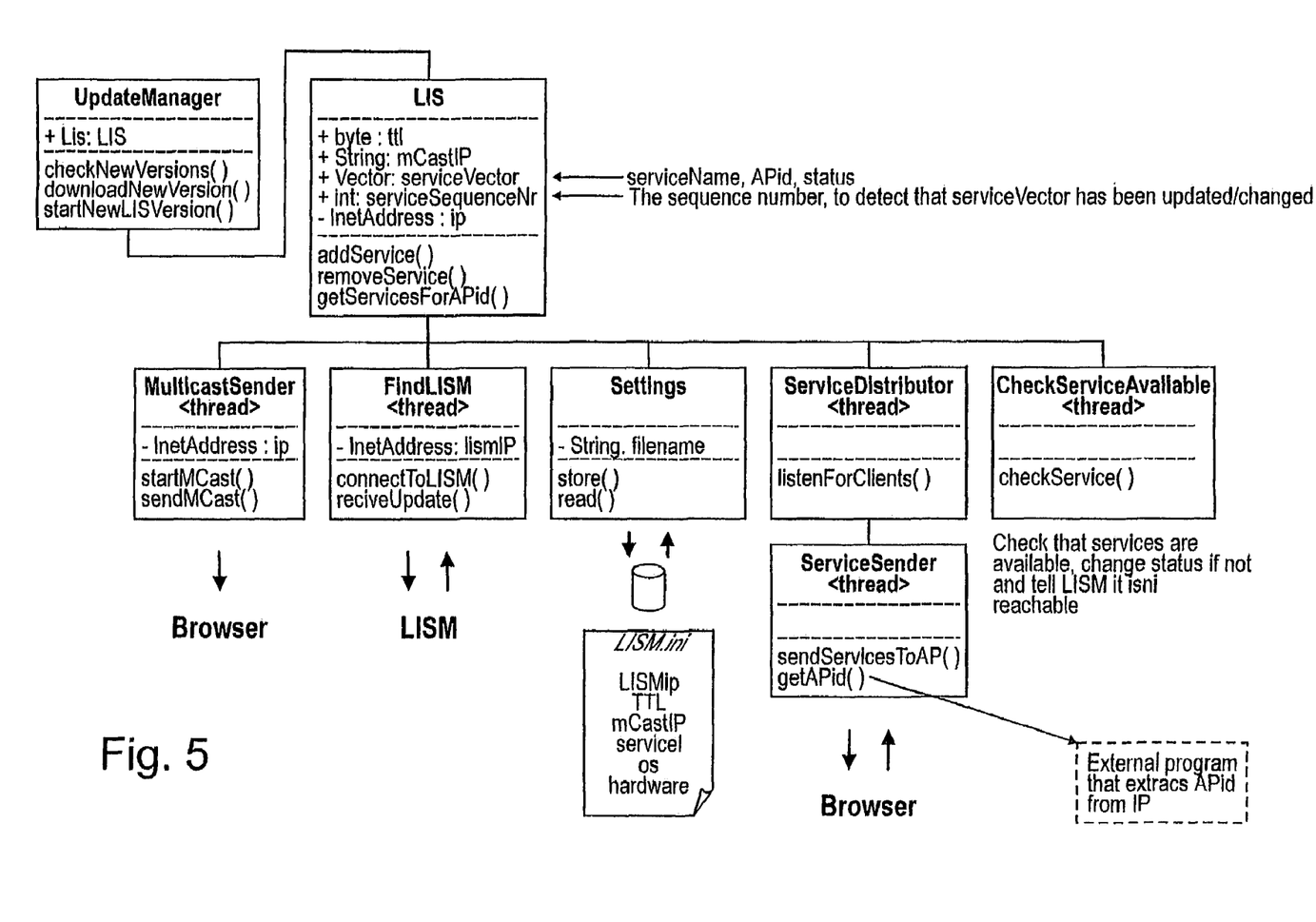
FIG. 5 is a class diagram of a local information server run in a local network.
Figure 6:
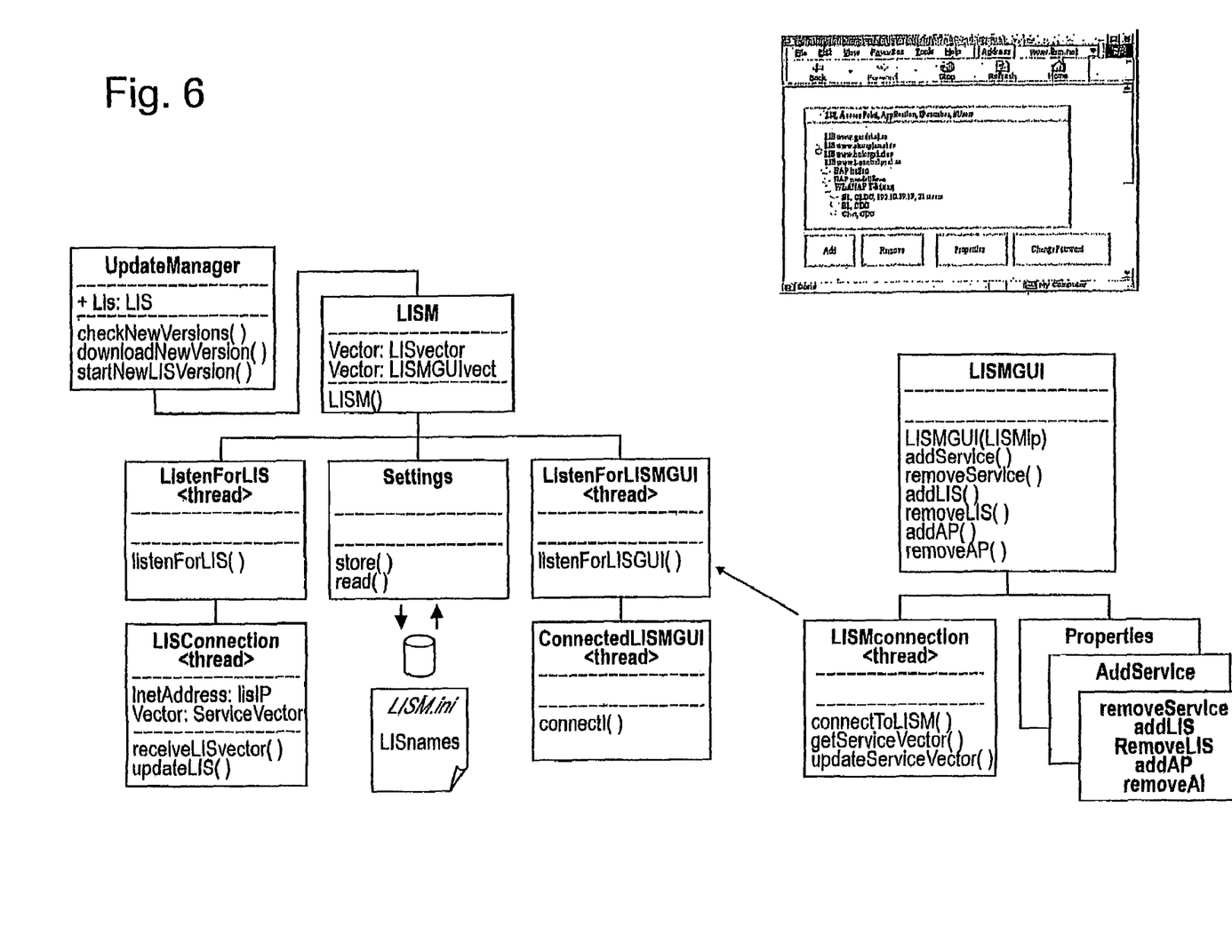
FIG. 6 is a class diagram of a local information server manager and the graphical interface there-of run in a WEB-server.
Figure 7:
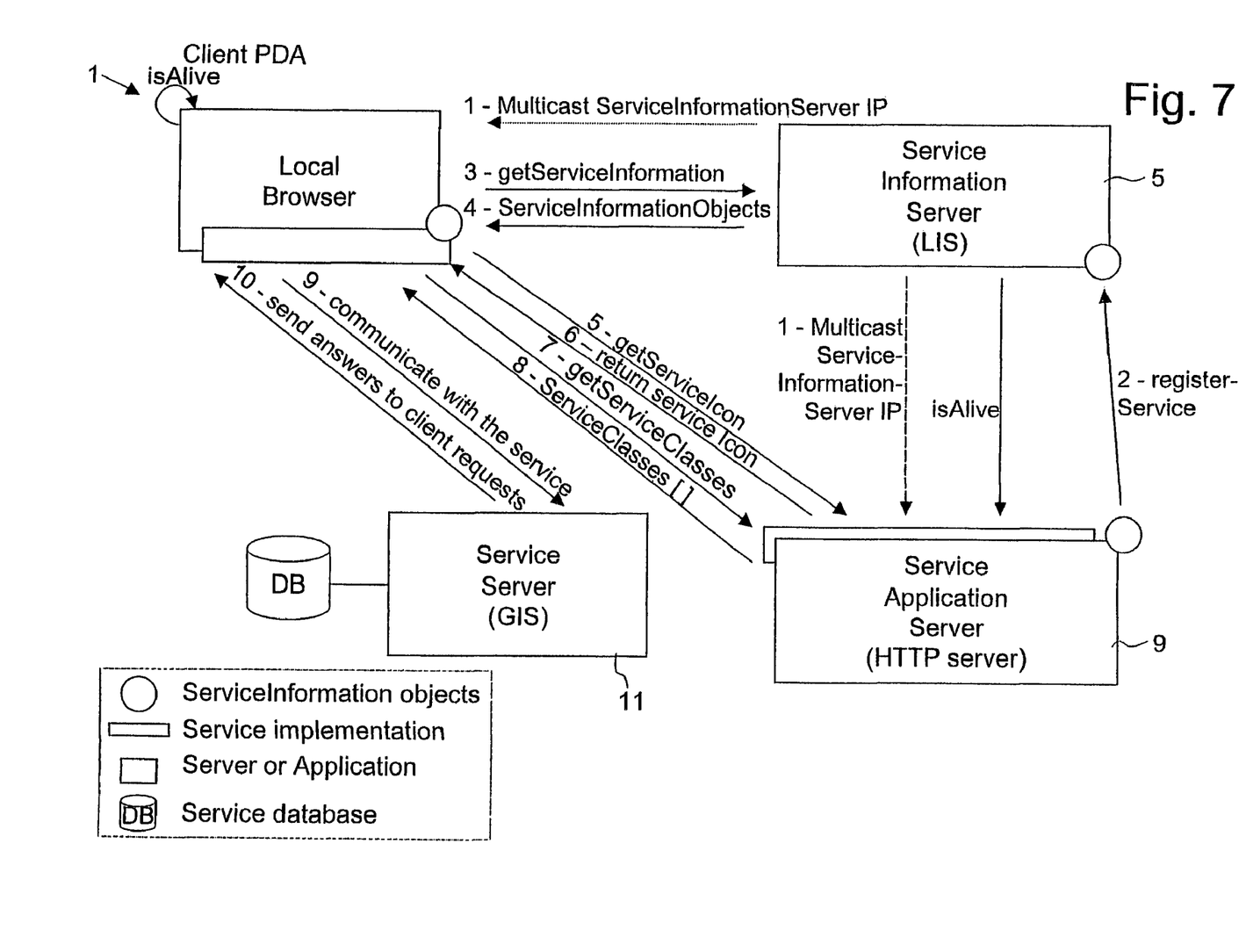
FIG. 7 is diagram similar to that of FIG. 6 showing the messages sent in a slightly different embodiment of a system for locally providing information.
Figure 8:
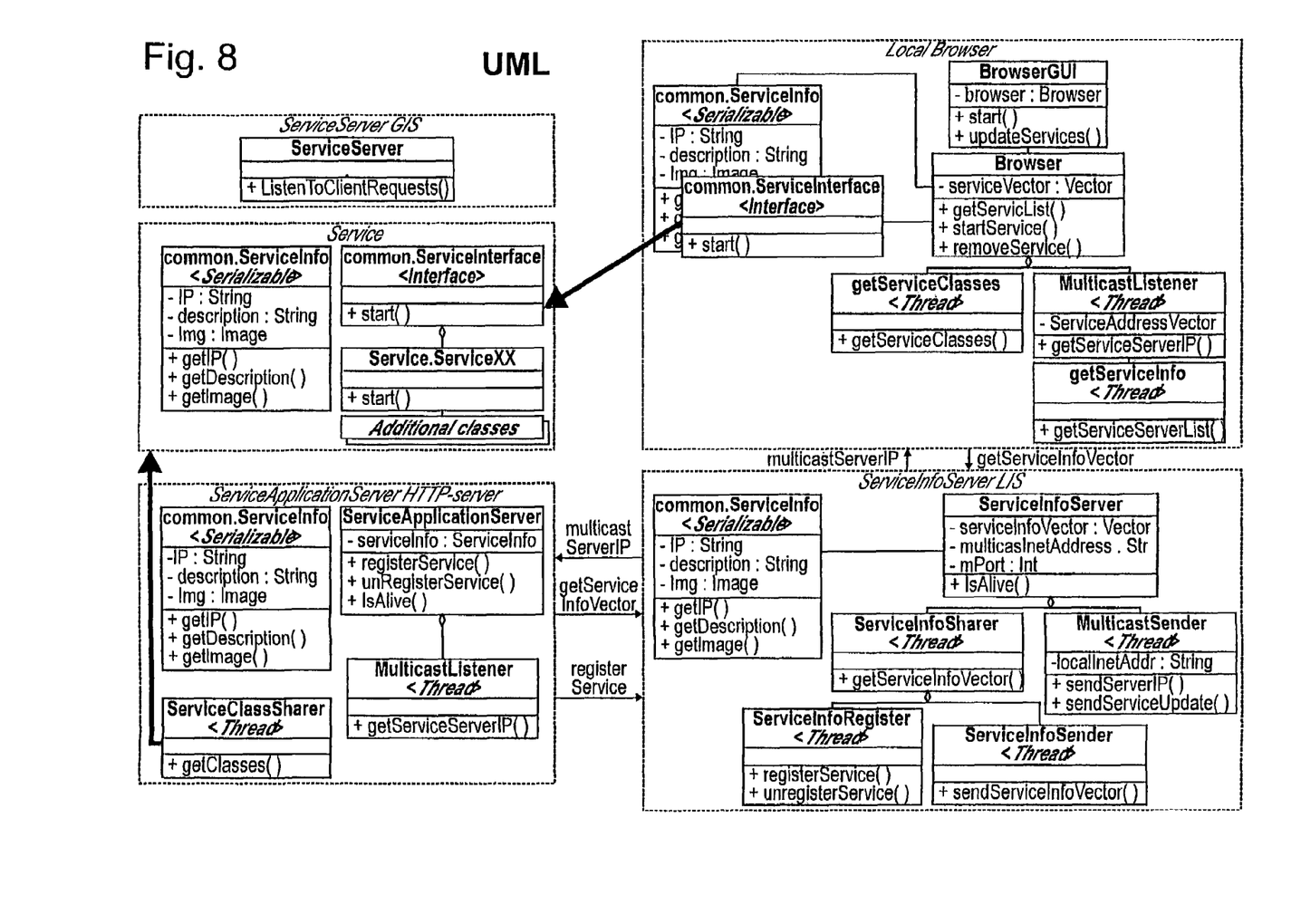
FIG. 8 is diagram of the vectors and classes used in the units of the system illustrated in FIG. 7.
Figure 9:
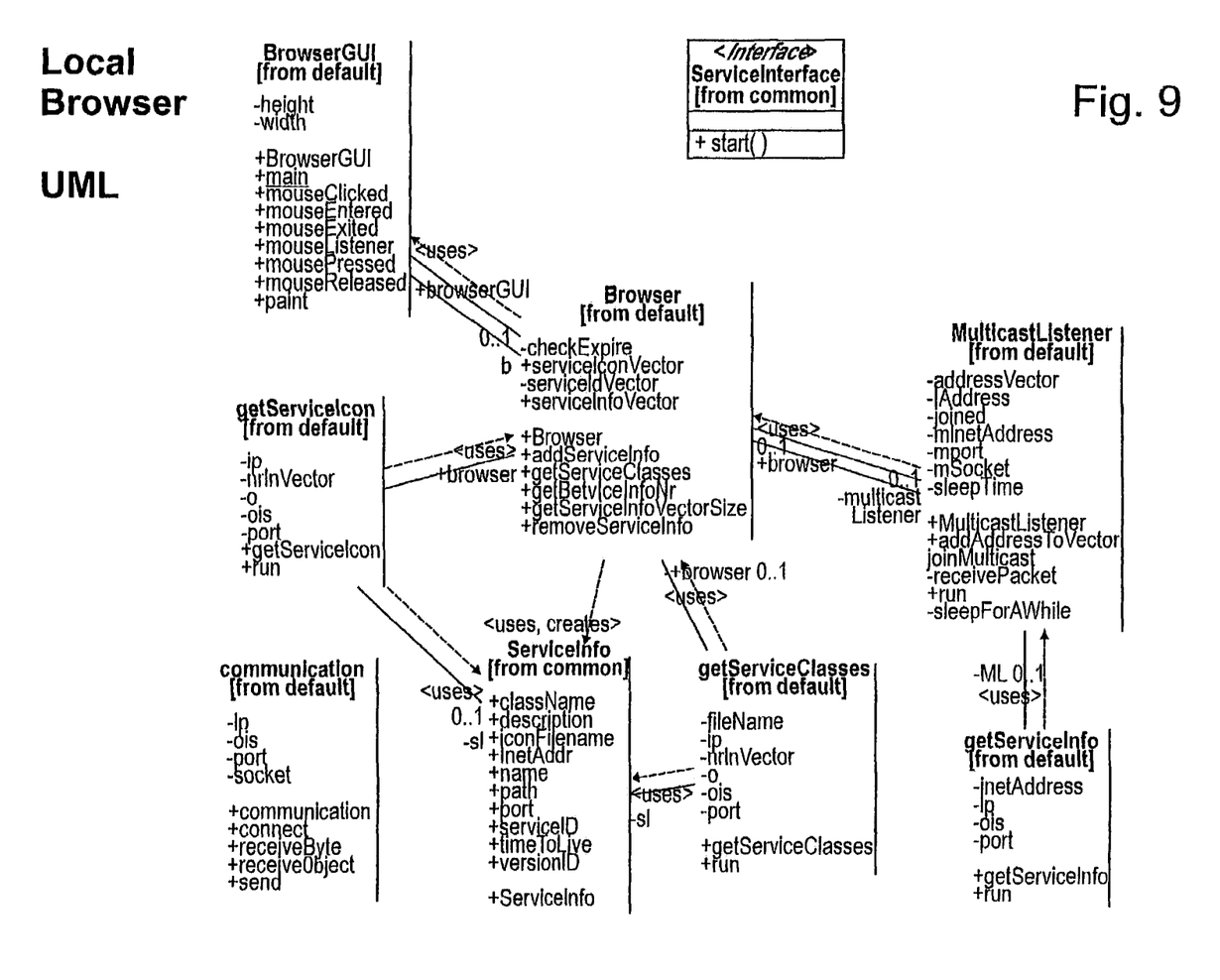
FIG. 9 is a detailed diagram of vectors and classes of a local browser run in a user device in the system of FIG. 7.
Figure 10:
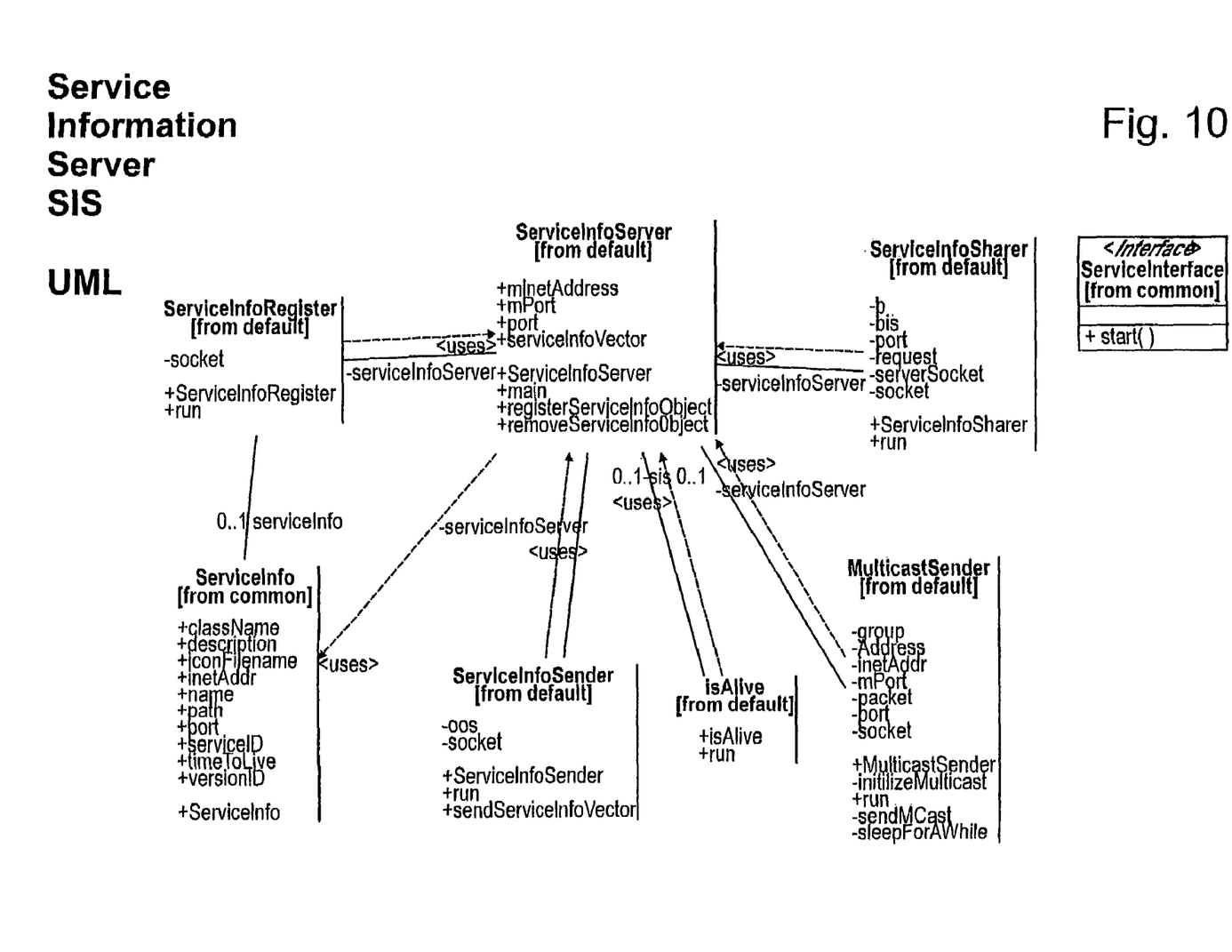
FIG. 10 is a detailed diagram of vectors and classes of a local information server in the system of FIG. 7.
Figure 11:
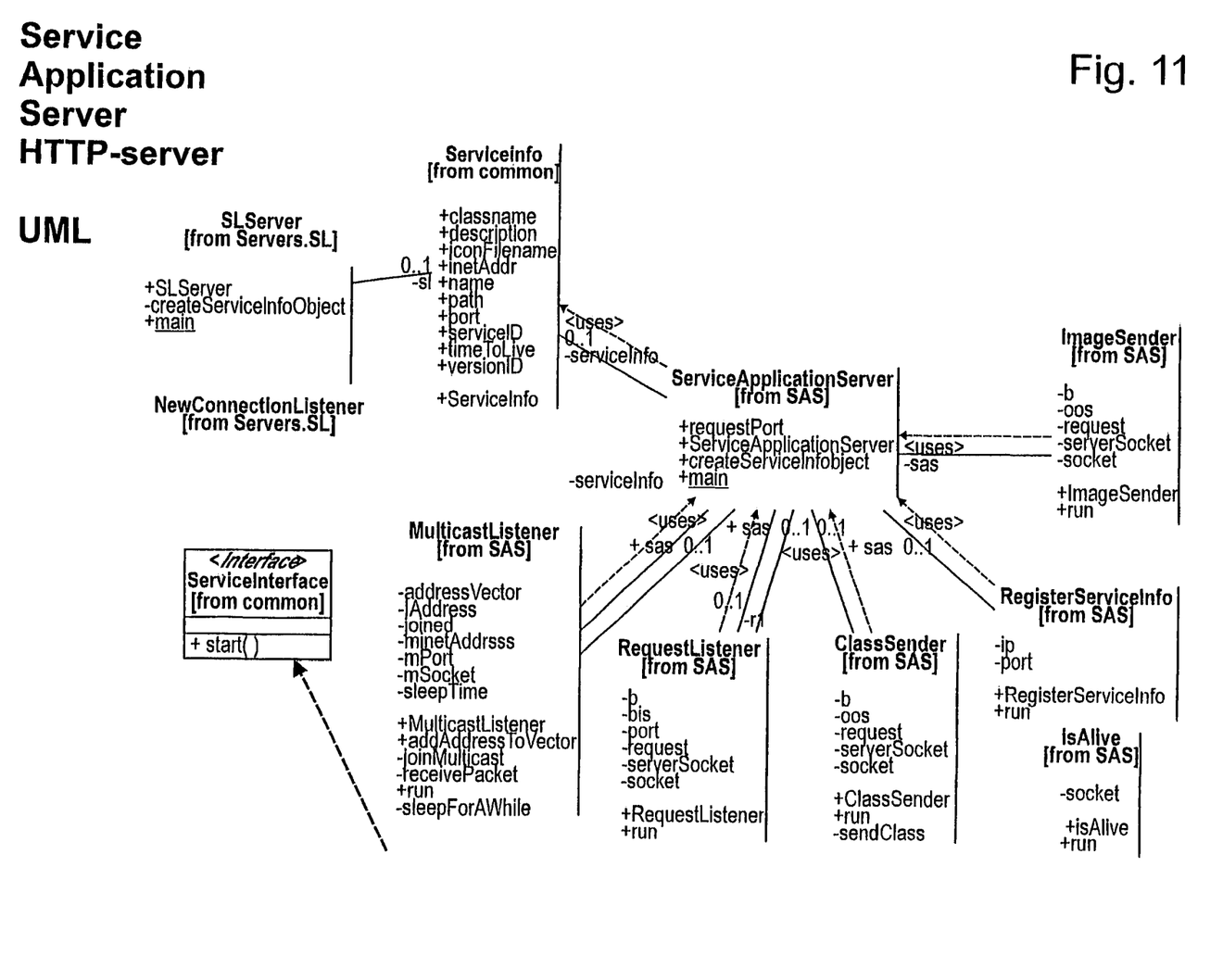
FIG. 11 is a detailed diagram of vectors and classes of an HTTP information server in the system of FIG. 7.
Figure 12:
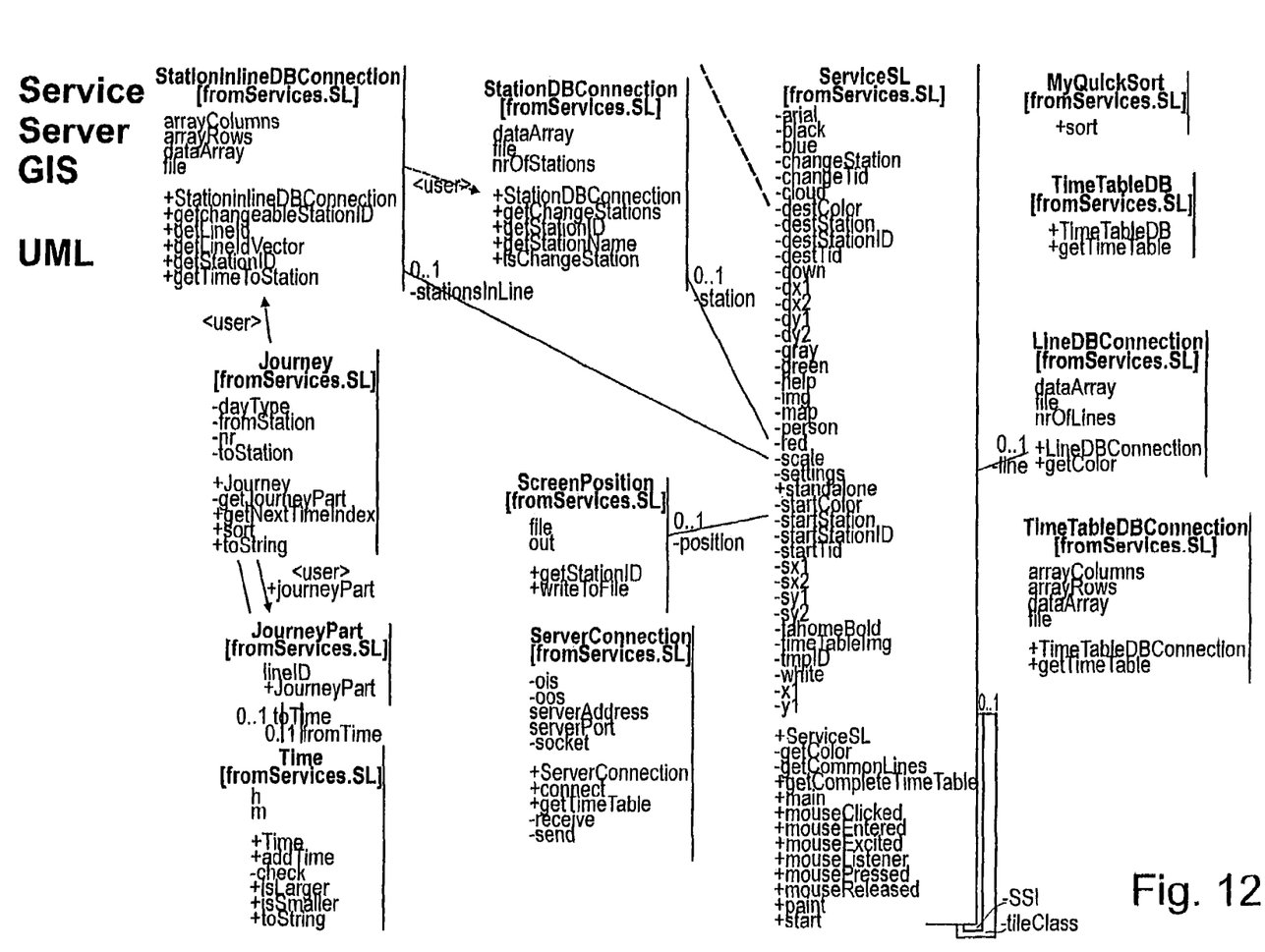
FIG. 12 is a detailed diagram of service provided by a general information server in the system of FIG. 7.

A diagram of the routines or classes included in the local browser is shown in FIG. 4, the classes being logically collected in sections. The listening functions are performed in a section 41, ListenForLIS and has a thread performed in a class listenForLIS( ). Two vectors LISip and LISconnections hold information on the IP-address of a detected LIS and additional information on an LIS with which a connection is to be established respectively. For each detected LIS the section or thread 43, LISconnection, is entered It uses the vectors address information InetAddress obtained from the vector LISip and the vector LISservices holding the list of services available as announced by the respective LIS. In the class listenForLIS( ) the listing for the respective LIS is performed to monitor that it is still possible to receive the multicast packets issued therefrom. In the class getLocalServices( ) a connection to the LIS is established and the list of available services is received.

A typical case will now be described. A user is walking down town He gets hungry and enters McDonalds. Once he enters the door, an icon with a McDonalds "m" appears. He walks-to an empty table, sits down and clicks the icon. The local browser downloads an application and starts it The application shows the menu of the restaurant He selects the food he wants to eat and presses "order". The server application registers the order and makes sure that the food gets delivered to the customer.

While he sits and waiting for the food to be delivered, he clicks some of the other icons that appeared when he entered McDonalds. He reads the newspaper through the "McDonalds News" application, plays the funny "Catch Hamburger" game, and plans his trip to the museum through the local transport-application. He also chooses to keep the local transport information application for offline usage during his time here in Stockholm.

In another example a user arrives to a hotel. When he enters the reception an icon named "check in" appears in his local browser. He presses the icon and the application is downloaded, installed and started in just a second. He enters his name and password and upon completing it he receives the key-code to his room. He looks at the map application to navigate to his room. Then he walks to the pub and sits down. He clicks the pub menu icon and orders a refreshing drink to cool him self down with while reading his new electronic mail messages.

While specific embodiments of the invention have been illustrated and described herein, it is realized that numerous additional advantages, modifications and changes will readily occur to those skilled in the art Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

The invention claimed is:

1. A system for locally providing information comprising:
   a portable device including a display and means for connecting to a local network, and
   a local information server connected to or arranged to establish said local network, the portable device and the local information server being capable of connecting to each other in the local network, wherein
   the local information server is arranged for periodically emitting signals in the local network indicating the existence of the local information server,
   the portable device is arranged to listen to the signals and when the signals are detected, to connect to the local information server in the local network, and to receive from the local information server address information of how to access available services, each of said available services including a user part and an information part with information of that service,
   the portable device is arranged, after having received the address information, to connect, via the local network, to a storage information server connected in a general service network using said address information and to obtain from the storage information server said information of the available services,
   the portable device is arranged to graphically show on its display symbols derived from said obtained information, each symbol being associated with an individual available service, and
   the portable device is arranged to obtain, after a user of the portable device has marked or indicated one of the symbols shown on the display, from the general service network, via the local network, the user part of the service, with which the symbol is associated, the user part comprising an executable program, and to store the user part in a memory of the portable device and to automatically install and start executing the executable program of the user part,
   wherein the portable device is arranged to continue, after detecting the signals emitted by a local information server and connecting thereto, to listen to the signals emitted by the local information server, and to automatically remove from the display, after a predetermined time period elapsed from a last time when the signals were detected, the symbols associated with the services available in the information previously obtained from the storage information server, and to automatically remove from the memory the user part stored therein.

2. The system of claim 1 wherein the local network is an IP-based network.

3. The system of claim 1 wherein the available services are associated with the current geographical location of the portable device.

4. The system of claim 1 wherein the available services are network zone dependent.

5. The system of claim 1 wherein the portable device is arranged to listen to the periodically emitted signals, and to connect to the storage information server via a single access point.

6. The system of claim 1 wherein the portable device is arranged to listen to the periodically emitted signals, and to connect to the storage information server via a single base unit.

7. The system of claim 1 wherein the local network is a Bluetooth network.

8. The system of claim 1 wherein said obtained information also includes descriptive information of the available services.

9. The system of claim 8 wherein said descriptive information of the available services is relatively short information.

10. The system of claim 1 wherein the storage information server includes storage means for storing said information and the user parts of the available services.

11. The system of claim 10 wherein the local information server is arranged for periodically emitting signals in the local network indicating the existence of the local information server via multicast messages.

12. The system of claim 10 wherein the local information server is arranged for periodically emitting signals in the local network indicating the existence of the local information server via broadcast messages.

13. The system of claim 1 wherein the local network is a LAN.

14. The system of claim 13 wherein the local network is a WLAN.

15. A method of locally providing information to at least one portable device having a display comprising the steps of:
   periodically emitting signals from a local information server indicating the existence of the local information server,
   the portable device listening all the time to signals emitted from the local information server,
   the portable device connecting, after having detected the signals, in a local network to the local information server and obtaining from there address information of how to access available services, each of said available services including a user part and an information part with information of that service,
   the portable device connecting, after having received the address information, via the local network to a general service network and to a storage information server therein, using said address information, and obtaining from there said information of the available services,
   the portable device graphically showing on a display thereof symbols derived from said obtained information, each symbol being associated with an individual available service, the portable device obtaining, after a user of the portable device has marked or indicated one of the symbols shown on the display, from the storage information server, via the local network and the general service network, the user part of the service with which the symbol is associated, the user part comprising an executable program, and storing the user part in a memory of the portable device, and automatically installing and starting to execute the executable program of the user part, the portable device continuing, after having detected the signals emitted by a local information server and connected thereto, to listen to the signals emitted by the local information server, and the portable device automatically removing from the display, after a predetermined time period having elapsed from a last time when the signals were detected, the symbols associated with the services available in the information previously obtained from the local information server, and automatically removing the user part stored in the memory of the portable device.

16. The method of claim 15 wherein said information includes descriptive information of the available services.

17. The method of claim 15 further including the step of storing in the storage information server connected in the general service network, information and the user parts of the available services.

18. The method of claim 15 wherein the local information server periodically emits signals in the local network indicating the existence of the local information server via multicast messages.

19. The method of claim 15 wherein the local information server periodically emits signals in the local network indicating the existence of the local information server via broadcast messages.

20. The method of claim 15 wherein the available services are associated with the current geographical location of the portable device.

21. The method of claim 15 wherein the portable device listens to the periodically emitted signals, and connects to the storage information server via a single access point.

22. The method of claim 15 wherein the portable device listens to the periodically emitted signals, and connects to the storage information server via a single base unit.

23. The method of claim 15 wherein the local network is an IP-based LAN.

24. The method of claim 15 wherein the local network is WLAN.

25. The method of claim 15 wherein the local network is a Bluetooth network.

* * * * *